United States Patent
Gilra et al.

(10) Patent No.: US 8,086,060 B1
(45) Date of Patent: Dec. 27, 2011

(54) SYSTEMS AND METHODS FOR THREE-DIMENSIONAL ENHANCEMENT OF TWO-DIMENSIONAL IMAGES

(75) Inventors: Anant Gilra, New Delhi (IN); Arun Koormamtharayil, Kerala (IN)

(73) Assignee: Adobe Systems Incorporated, San Jose, CA (US)

( * ) Notice: Subject to any disclaimer, the term of this patent is extended or adjusted under 35 U.S.C. 154(b) by 1111 days.

(21) Appl. No.: 11/973,952

(22) Filed: Oct. 11, 2007

(51) Int. Cl.
*G06K 9/00* (2006.01)
*G06K 9/40* (2006.01)

(52) U.S. Cl. .......................... 382/254; 382/154

(58) Field of Classification Search .............. 382/154, 382/173, 254, 276; 348/273, 247, 449; 345/419, 345/51, 589
See application file for complete search history.

(56) References Cited

U.S. PATENT DOCUMENTS

| | | | |
|---|---|---|---|
| 6,718,068 B1 * | 4/2004 | Gindele et al. | 382/254 |
| 7,050,646 B2 * | 5/2006 | Xu et al. | 382/254 |
| 7,545,974 B2 * | 6/2009 | Jeong et al. | 382/154 |
| 7,616,254 B2 * | 11/2009 | Wong et al. | 348/349 |
| 7,711,201 B2 * | 5/2010 | Wong et al. | 382/254 |
| 7,869,649 B2 * | 1/2011 | Watanabe et al. | 382/162 |
| 2002/0175921 A1 * | 11/2002 | Xu et al. | 345/589 |
| 2003/0228067 A1 * | 12/2003 | Miyake et al. | 382/275 |
| 2007/0019883 A1 * | 1/2007 | Wong et al. | 382/276 |
| 2007/0024614 A1 * | 2/2007 | Tam et al. | 345/419 |
| 2007/0036427 A1 * | 2/2007 | Nakamura et al. | 382/154 |
| 2007/0216765 A1 * | 9/2007 | Wong et al. | 348/46 |
| 2007/0262982 A1 * | 11/2007 | Ninomiya | 345/419 |

OTHER PUBLICATIONS

Subbarao, M.; Gurumoorthy, N.; , "Depth recovery from blurred edges," Computer Vision and Pattern Recognition, 1988. Proceedings CVPR '88., Computer Society Conference on , vol., no., pp. 498-503, Jun. 5-9, 1988.*
Ens, J.; Lawrence, P.; , "An investigation of methods for determining depth from focus," Pattern Analysis and Machine Intelligence, IEEE Transactions on , vol. 15, No. 2, pp. 97-108, Feb. 1993.*
Shang-Hong Lai; Chang-Wu Fu; Shyang Chang; , "A generalized depth estimation algorithm with a single image," Pattern Analysis and Machine Intelligence, IEEE Transactions on , vol. 14, No. 4, pp. 405-411, Apr. 1992.*

* cited by examiner

Primary Examiner — Gregory M Desire
Assistant Examiner — Andrae S Allison
(74) Attorney, Agent, or Firm — Kilpatrick Townsend and Stockton LLP

(57) ABSTRACT

Systems and methods for three-dimensional enhancement of two dimensional images are disclosed. One method includes the steps of selecting a first selection and a second selection within an image, the image including a plurality of pixels; calculating a scaling factor for each pixel in a set of pixels in the image based at least in part on the first and second selections, the scaling factor indicating a relative depth of a pixel; applying a filter to the set of pixels, the filter including at least one filter difference for each pixel in the set of pixels; generating a modified image at least by modifying a pixel attribute for each pixel in the set of pixels based at least in part on the scaling factor and the filter difference; and outputting the modified image.

26 Claims, 20 Drawing Sheets
(3 of 20 Drawing Sheet(s) Filed in Color)

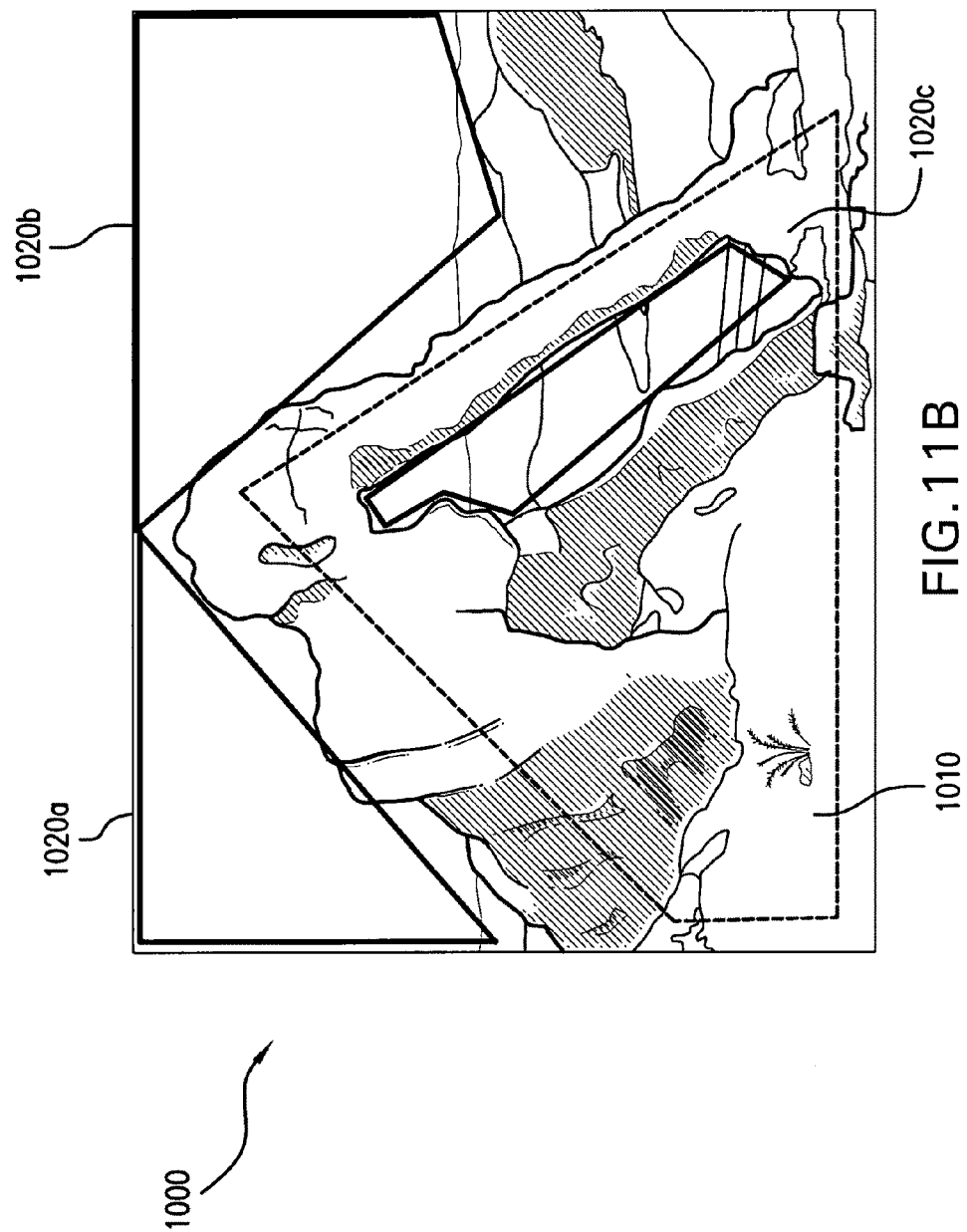

SYSTEMS AND METHODS FOR THREE-DIMENSIONAL ENHANCEMENT OF TWO-DIMENSIONAL IMAGES

FIELD OF THE INVENTION

The present invention generally relates to image enhancement, and more specifically relates to three-dimensional enhancement of two-dimensional images.

BACKGROUND

Two-dimensional images, such as photographs, typically do not provide a good sense of depth or distance. For example, landscape photographs may show features many miles in the distance. However, the contrast between objects near to the camera and objects in the distance does not provide a sense of three-dimensional depth. Thus, such images tend to look flat. Talented photographers may be better able to capture a sensation of depth within a photograph by carefully selecting exposure times, lighting, and other factors. However, most photographers are less skilled, and are less able to capture the depth of a scene. In either case, photographs may benefit from three-dimensional enhancement.

While there are many ways to enhance an image that are known, such as sharpening and adjusting color or contrast values uniformly across an image, methods of enhancing two-dimensional images to provide an increased three-dimensional appearance do not analyze user-selected pixels or regions or adjust pixel attributes in a graduated manner to provide a two-dimensional image having an enhanced three-dimensional appearance.

SUMMARY

Embodiments of the present invention provide methods and systems for three-dimensional enhancement of two-dimensional images. For example, in one illustrative embodiment, a method for enhancing an image comprises selecting a first selection and a second selection within an image, the image comprising a plurality of pixels; calculating a scaling factor for each pixel in a set of pixels in the image based at least in part on the first and second selections, the scaling factor indicating a relative depth of a pixel; applying a filter to the set of pixels, the filter comprising at least one filter difference for each pixel in the set of pixels; generating a modified image at least by modifying a pixel attribute for each pixel in the set of pixels based at least in part on the scaling factor and the filter difference; and outputting the modified image.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention are better understood when the following Detailed Description is read with reference to the accompanying drawings, wherein:

FIG. 11B shows the image of FIG. 11A having first and second regions using one embodiment of the present invention;

DETAILED DESCRIPTION

Figure 1:
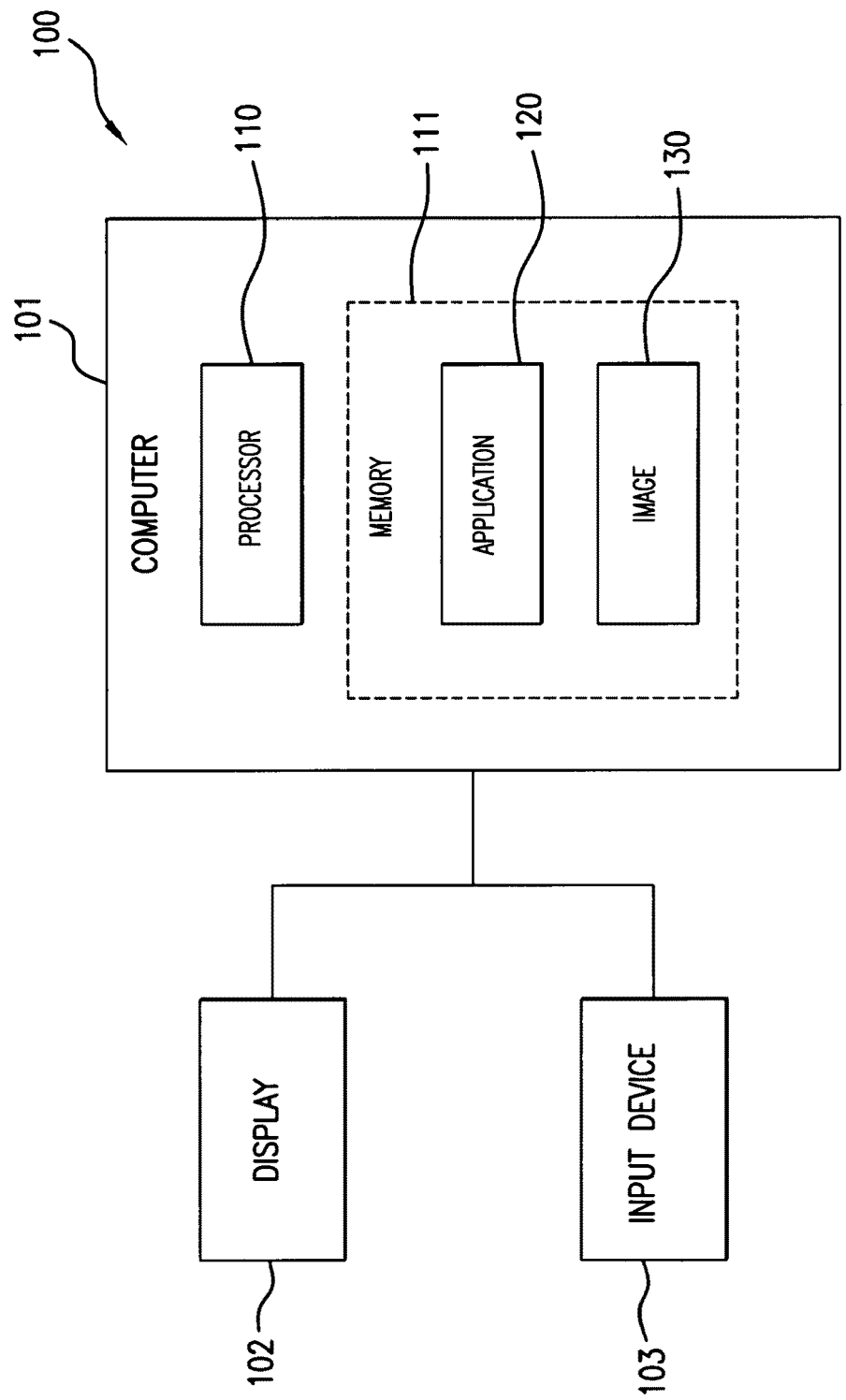
FIG. 1 shows an illustrative system for three-dimensional enhancement of two-dimensional images according to one embodiment of the present invention.

Embodiments of the present invention comprise systems, methods, and products for three-dimensional enhancement of two-dimensional images. Two dimensional images, such as photographs, typically do not provide a good perception of depth. Thus, it may be desirable to enhance the image to provide a greater sense of three dimensions by emphasizing distances of objects or areas within the image from the camera. Three dimensional enhancement of two-dimensional images according to various embodiments of the present invention can be accomplished by identifying pixels or regions in an image that correspond to points or areas close to the camera, and points or areas distant from the camera. The term 'camera' is used throughout to refer to a location of a hypothetical camera that took a picture of the scene that resulted in the image. The pixels or regions may be used to calculate scaling factors for each pixel that makes up the image based on the pixels' proximity to the different pixels or regions. Once the scaling factors are calculated, a filter is applied to the image, such as a brightness filter or a contrast filter. The filter will have the effect of adjusting pixel attributes, such as color. Thus, the application of a filter to a pixel causes the pixel's color to be changed by an amount referred to as the filter difference. However, before the filter is applied, the filter difference at each pixel is scaled based on the scaling factor. Once the filter difference for a pixel has been scaled, the pixel's attributes are adjusted based on the scaled filter difference. Conceptually, a scaling factor generally relates to a pixel's distance from the camera. In some cases, a low scaling factor tends to indicate that a pixel is distant from the camera, while a high scaling factor tends to indicate that a pixel is close to the camera. Thus, it is possible to calculate a quasi-depth value for each pixel, and to adjust a pixel's displayed color based on its "depth."

By scaling filter differences, embodiments of the present invention may provide a sense of three-dimensions in a two-dimensional image. For example, when viewed at a distance, an object's colors tend to become faded or less bright, there may be less contrast with other nearby colors, and individual shapes or features may become more difficult to see as details become fuzzy. Conversely, objects that are close to the camera typically are very clear with vibrant colors, high degrees of contrast, and clear, well-defined shapes. By using the scaling factor to modify filter differences, such as may be produced by brightness, contrast or other filters, parts of an image may be made more vivid, bright, or have greater contrast, while other parts may be made more faded, fuzzy, or have reduced contrast. Thus, by modifying filter differences according to the relative distance of a pixel from the camera, pixels near to the camera may be emphasized, while pixels distant from the camera may be de-emphasized, thereby providing an enhanced perception of depth.

Illustrative Three-Dimensional Enhancement

FIG. 1 shows an illustrative system 100 for three-dimensional enhancement of two-dimensional images according to one embodiment of the present invention. In the illustrative embodiment shown in FIG. 1, the system 100 comprises a computer 101, a display 102, and an input device 103. Computer 101 comprises a processor 110 and a computer-readable medium, such as a memory 111, having an image enhancement application 120 and an image 130 stored therein. The system 100 executes image enhancing application 120 to provide three-dimensional enhancement of a two-dimensional image. For example, a user may use an input device 103, such as a mouse, to interact with the application 120 and the image 130 to specify parameters for enhancing the image 130. After receiving the user's input, the application 120 enhances the image 120, and displays the enhanced image on the display 102.

Figure 5:
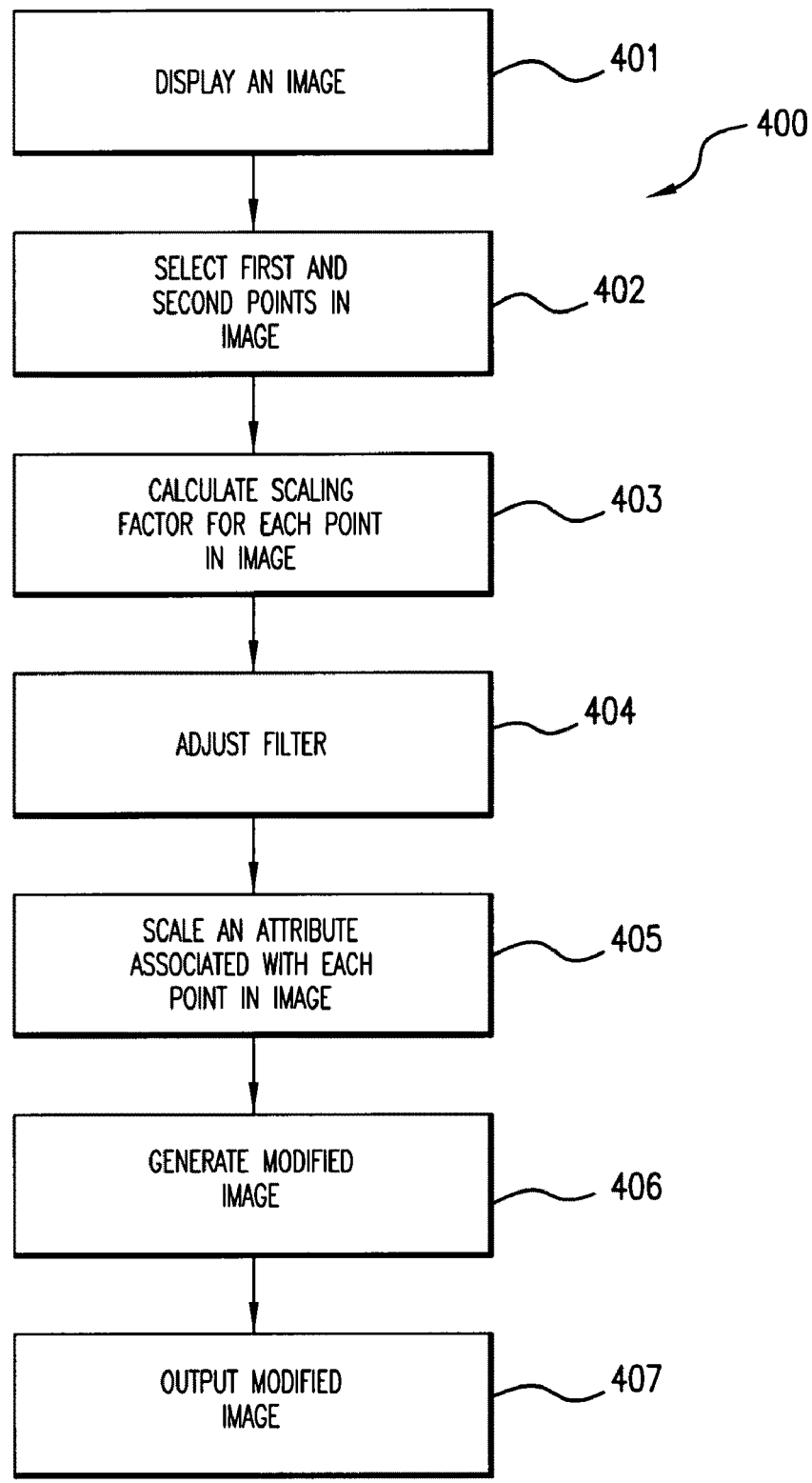
FIG. 5 shows a method for three-dimensional enhancement of two-dimensional images according to one embodiment of the present invention.

Further embodiments of the present invention will be described in more detail below with respect to FIG. 5. FIG. 5 shows a method 400 for three-dimensional enhancement of two-dimensional images according to one embodiment of the present invention. The method 400 shown in FIG. 5 will be discussed with reference to the system 100 shown in FIG. 1, but could be used with other systems as well.

Figure 2:
FIGS. 2 and 2A show an image to be enhanced using one embodiment of the present invention.
Figure 2A:
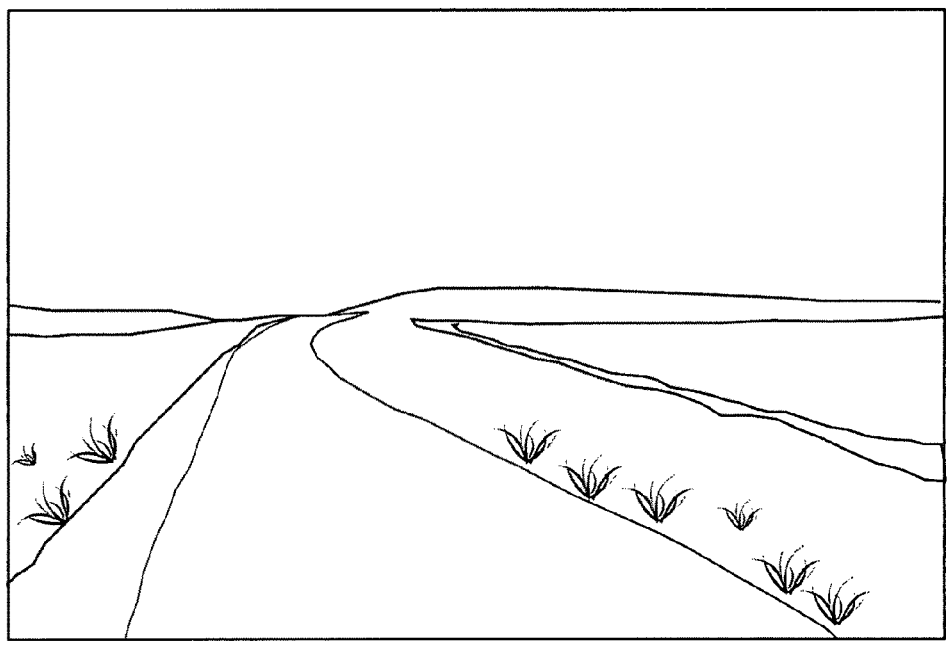

The method 400 shown in FIG. 5 begins in block 401 when a computer, such as computer 101, executes an application, such as application 120, and causes an image, such as image 130 shown in FIGS. 2 and 2A, to be displayed on a display, such as display 102. The image 130 may be any graphically-displayed image, including without limitation bitmapped images and vector images. Types of images may include without limitation photographs, rendered or other computer-generated images, scanned images of hand-drawn animation stills or backgrounds, or frames of video. Images suitable for use with embodiments of the present invention generally comprise a plurality of pixels that are displayed to the user, though embodiments of the present invention may properly enhance images comprising only a single pixel.

Figure 3:
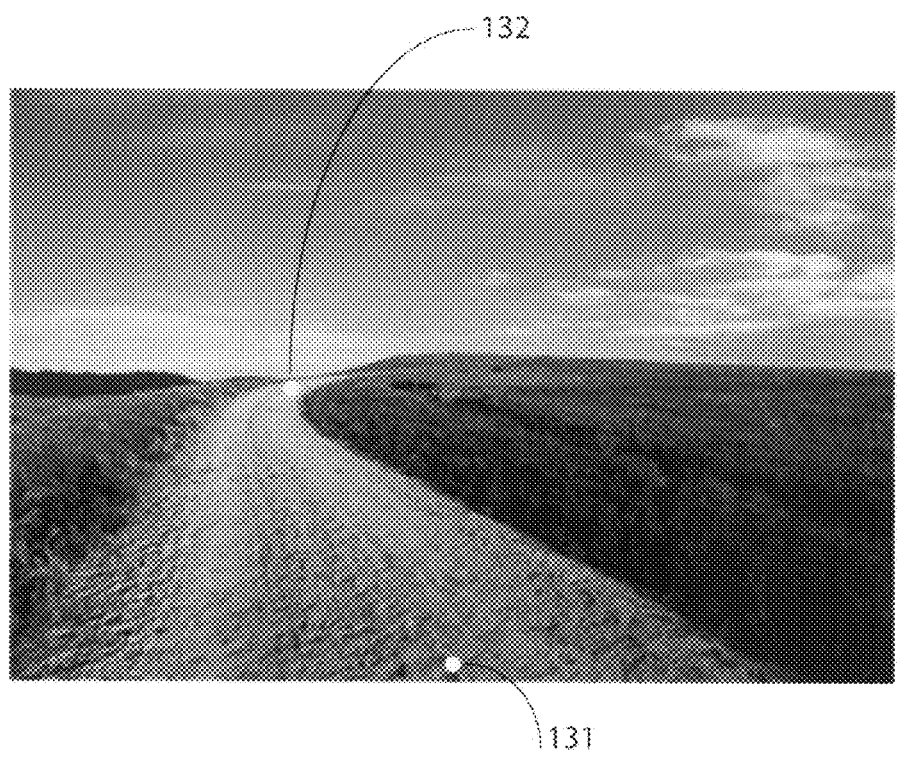
FIGS. 3 and 3A show the image of FIGS. 2 and 2A with selected first and second pixels using one embodiment of the present invention.
Figure 3A:
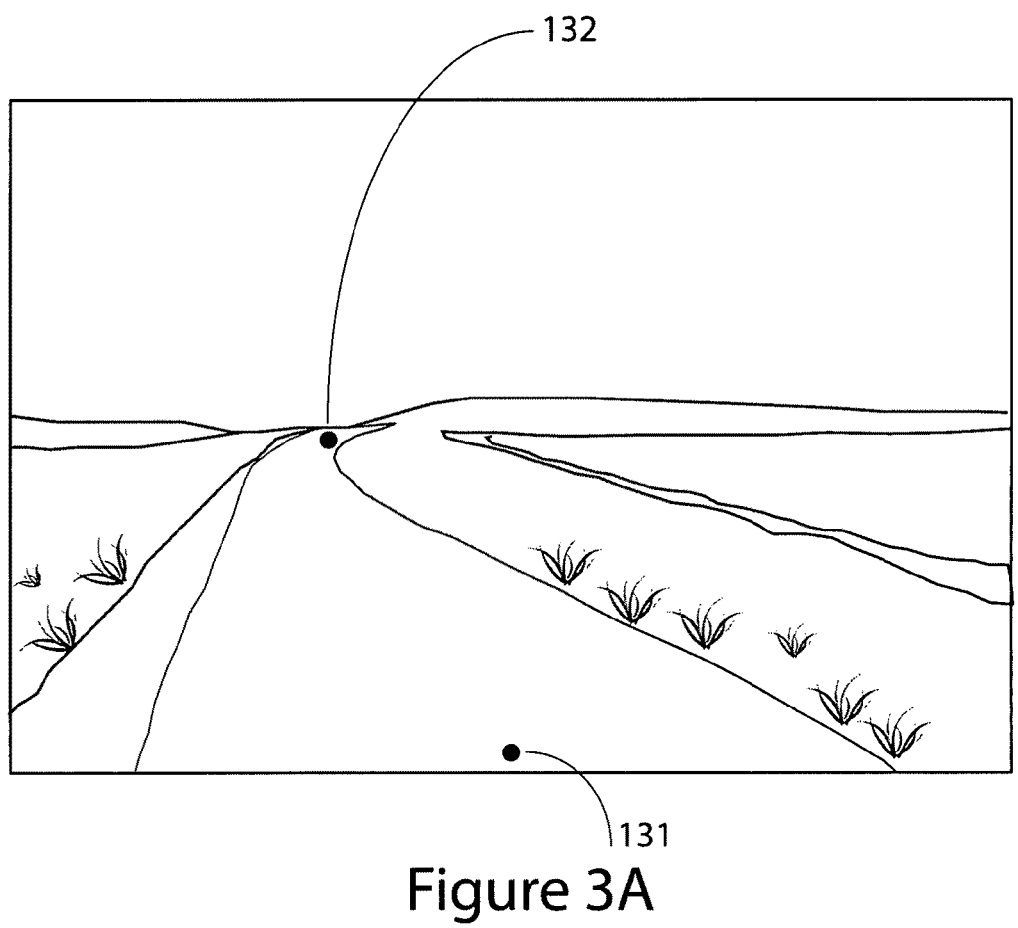

In block 402, a user of the application 120 selects a first selection and a second selection 131, 132 within the image 130, shown, for example, in FIG. 3. For example, a user of the system 100 may interact with the application 120 and the image 130 using the input device, which may be a conventional mouse. In one embodiment of the present invention, a selection comprises a pixel. For example the embodiment shown in FIG. 3 includes a first selection 131 that comprises a first pixel 131. In one embodiment of the present invention, the second selection comprises a single pixel. The embodiment shown in FIG. 3 includes a second selection 132 that comprises a second pixel 132. In some other embodiments, the first and/or second selection may comprise a region instead of a pixel. In a further embodiment, the first and/or second selection may comprise a set of pixels. In the embodiment shown in FIG. 3, the first selection and the second selection each comprise a single pixel, though the selected pixels 131, 132 are shown larger for illustrative purposes.

In one embodiment of the present invention, the user selects a first pixel 131 indicating a pixel in the image that is near to the camera, and the second pixel 132 in the image that is distant from the camera. For example, the user may use a mouse to navigate to the desired first pixel on the image and use the mouse button to select the first pixel. In another embodiment, a user may touch a touchscreen at a location on the image to select the first pixel. In a further embodiment, a user may touch a multi-touch device at a plurality of locations to select one or more first pixels. Still further embodiments would be apparent to one of ordinary skill in the art.

The first and second pixels may be selected arbitrarily by the user and need not be selected according to any algorithm. Alternatively, a methodology or automated process for selecting the first and/or second pixels 131, 132 may be used. Selection of different pairs of pixels may cause different results in the output of the method 400; however, the method 400 is capable of accepting any two arbitrarily-selected pixels within the image 130.

In block 403, the application 120 calculates a scaling factor for each pixel in a set of pixels in the image. A set of pixels can be one or more pixels within the image, up to and including all of the pixels within the image. In one embodiment of the present invention, a set of pixels may comprise some of the pixels within the image. For example, the set of pixels may comprise sufficient pixels to provide three-dimensional enhancement of the image. A set of pixels may be selected by a user, such as by selecting one or more areas within the image. For example, the user may use a tool to select a rectangular region within the image.

As was discussed previously, the scaling factor provides a pseudo depth dimension for each pixel in the set of pixels. At the second pixel, where the scaling factor is at its lowest value in this embodiment, the scaling factor represents the most distant pixel in the image. The pixels close to the second pixel, which may also have very low scaling factors, also likely represent pixels that are distant. Conversely, the scaling factor has its maximum value at the first selected pixel in this embodiment, representing the "nearest" pixel to the camera. Pixels near the first selected pixel also tend to have high scaling factors, indicating they are near to the camera. Thus, the scaling factor generally represents the relative distance of an arbitrary pixel from the camera, and may be used to scale pixel attributes to provide brighter colors and greater contrast for pixels near to the camera, and faded colors and reduced contrast for distant pixels.

In the embodiment shown in FIG. 5, the scaling factor for any arbitrary pixel is computed based on the following formula:

$$F=D2/(D1+D2) \quad (1)$$

F represents the scaling factor, and may have a different value for each pixel in the image 130. For any arbitrary pixel in the image 130, D1 is the distance from the pixel to the first pixel 131, and D2 is the distance from the pixel to the second pixel 132. Thus, pixels at or near the first selected pixel will have a very high scaling factor. For example, if the scaling factor, F, is calculated for the pixel selected as the first pixel, D1 will be 0, leaving D2/D2, which is 1. Further, and more generally, any pixel that is much closer to the first pixel than to the second pixel (i.e. D2 is much greater than D1), the scaling factor will be close to 1, and the pixel will be only slightly affected by the scaling factor. Conversely, for pixels that are much closer to the second pixel than the first pixel (i.e. D2 is much less than D1), the scaling factor will be close to 0, and the pixel will be significantly affected by the scaling factor.

In one embodiment of the present invention, the user may specify a scaled range over which to scale pixel values. For example, in formula (1) for calculating F, above, F will have a value between 0 and 1, inclusive. However, it may be desirable to have a value of F within a larger or smaller range, or with different end points. For example, in one embodiment of the present invention, a user may select a maximum scaling factor of 20 for the first pixel, and a minimum scaling factor of 5 for the second pixel. In such an embodiment, the value of F would fall between 5 and 20, rather than between 0 and 1. In such an embodiment, a suitable equation for calculating F may be as follows:

$$F=15*[D2/(D1+D2)]+5 \quad (2)$$

Using such an equation, F will have a value between 5 (when D2=0; i.e. when the pixel is located at the second pixel) and 20 (when D1=0; i.e. when the pixel is at the first pixel). More generally, a scaling factor may be calculated for a scaled range between a minimum value, M, and a maximum value, X, using the following formula:

$$F=R*[D2/(D1+D2)]+M; R=X-M \quad (3)$$

In equation (3), M is the minimum value within the scaled range, and R is the magnitude of the range of scaled values.

In one embodiment of the present invention, a different equation may be used to calculate a scaling factor.

$$F=D1/(D1+D2) \quad (4)$$

Equation (4) is similar to equation (1), however, the numerator contains D1 rather than D2. D1 represents the distance from an arbitrary pixel to the first selection, and D2 represents the distance from the arbitrary pixel to the second selection. However, this equation will result in minimum scaling at the first selection, where D1=0, and maximum scaling at the second selection, where D2=0. Such an embodiment may be useful when reducing a brightness of an image. In such a case, a user may desire increased reduction for distant pixels, while only a minimal reduction for pixels near the camera.

Additionally, one embodiment may comprise an equation for calculating a scaling factor based on a scaled range from a minimum value, M, to a maximum value, X For example, one embodiment may comprise the following formula:

$$F=R*[D1/(D1+D2)]+M; R=X-M \quad (5)$$

In equation (5), M is the minimum value within the scaled range, and R is the magnitude of the range of scaled values.

Formulas (4) and (5) may be advantageously used by some embodiments of the present invention. For example, embodiments including without limitation the following filters: a reduction in brightness; a reduction in contrast; a decrease in HSB (hue/saturation/brightness) values; increased blur; increased noise; a decrease in sharpness, or an increase in distortion.

In one embodiment of the present invention, an image may have depth information associated with it. For example, some cameras may be able to determine the depth of pixels within an image, and store the depth information. In such an embodiment, a scaling factor at each pixel may be determined according to the following formula:

$$F=(D_{max}-D)/(D_{max}-D_{min}) \quad (6)$$

In an embodiment using equation (6), depth information at each pixel may be available. $D_{max}$ represents the maximum depth value within the image, while $D_{min}$ represents the minimum depth value within the image. D represents the depth value at an arbitrary pixel.

A related embodiment may comprise a formula similar to equation (6), which may be advantageously employed in some instances.

$$F=(D-D_{min})/(D_{max}-D_{min}) \quad (7)$$

In one embodiment, a filter may be applied such that the least scaling occurs at pixels closest to the camera. Equation (7) scales the factor accordingly, thus providing little scaling to pixels near the camera, while providing greater scaling to pixels distant from the camera.

In one embodiment of the present invention, a pixel may have a plurality of scaling factors. For example, a pixel may have a first scaling factor associated with the color channels associated with the pixel. In other embodiments, each color channel of a pixel may have a different scaling factor. A user may desire different scaled ranges for different pixel attributes to finely tune a three-dimensional enhancement of a two-dimensional image. For example, in one embodiment of the present invention, each color channel may have a different scaled range. In such an embodiment, a pixel may have a first scaled range of 1 to 5 for the red color channel, a second scaled range of 5 to 20 for the green color channel, and a third scaled range of 2 to 12 for the blue color channel.

In a further embodiment, the application 120 may allow a user to select a first and second set of pixels, wherein each set of pixels comprises one or more pixels. For example, a user may be able to select a first set of pixels to represent pixels near to the camera. The user may also be able to select a second set of pixels to represent pixels distant from the camera. In such an embodiment, a scaling factor for each pixel in the image may be based on the distance from each pixel to the pixel in the first and second sets that are closest to the pixel.

After the scaling factors have been calculated for each pixel in the set of pixels 130, the scaling factors may be stored for later use. For example, in one embodiment of the present invention, a file in which the image is stored (the "image file") may be extended to include scaling factor information. Alternatively, a scaling factor file may be created that is associated with the image file. The scaling factor file stores the scaling information associated with the image stored in the image file. Such an embodiment may be advantageous because the original, unmodified image file may be viewed without applying the scaling information. Further, the image file may be stored in a standard image file format, rather than an extended file format including the associated scaling factor information. In one embodiment, the position of the selections, for example first and second pixels 131, 132, may be stored in the image file or in a separate file. In such an embodiment, the enhancement of the image may be performed by an application reading the image file, such as reading the image file at run time.

In block 404, the user applies a filter to the set of pixels. The filter applied may be a standard filter, such as a brightness filter or a contrast filter. For example, a user may adjust or apply a brightness filter to the image. A brightness filter may cause pixels in the image to increase or decrease in intensity, based on whether the user desires the image to be brighter or darker. A filter may cause pixel attributes to be increased or decreased by some amount, which is referred to herein as the filter difference. Thus, when a user applies a filter, each pixel's color is increased or decreased by a filter difference associated with the filter. In some embodiments, the filter difference may be the same for each pixel in the image, while in other embodiments, each pixel may have a different filter difference.

In block 405, the scaling factors calculated for each pixel in the set of pixels are used to scale a filter difference associated with each pixel in the set of pixels. For example, in one embodiment of the present invention, each filter difference to be scaled is multiplied by the corresponding scaling factor. For example, an image may have a brightness filter applied to it. In such an embodiment, the color attributes for each pixel in the set of pixels may be adjusted based upon the filter differences generated from the filter. In such an embodiment, the scaling factor may be applied to the filter differences. Embodiments of the present invention may scale pixel attributes based on one or more filters, including without limitation brightness, contrast, sharpness, noise, distortion, negative, or blur (such as motion, radial, or zoom blurs). In one embodiment of the present invention, a plurality of filters may be applied to an image. Still further suitable filters would be apparent to one of ordinary skill in the art.

In one embodiment of the present invention, the scaling factor may be applied only to pixels within a portion of an image. For example, a user may select a portion of an image to enhance. In such an embodiment, scaling factors may be calculated and applied only to pixels within the selected portion of the image.

In one embodiment of the present invention comprising multiple scaling factors per pixel, each of the scaling factors may be multiplied with the filter differences corresponding to each of the different attributes of the pixel. For example, a pixel may have three attributes associated with it, such as red, blue, and green color channels. Each color channel may have a different scaling factor. In such an embodiment, each scaling factor may be used to scale the filter difference for the corresponding color channel.

In general, each pixel within the image has one color when displayed; however, the color may be determined based on one or more different attributes. An attribute may be any value associated with a pixel that is used to determine a color for the pixel when it is displayed. For example, in one embodiment of the present invention, a pixel may have a color based on three channels: a red channel, a green channel, and a blue channel (RGB). When the pixel is displayed, each of these channels is used to determine the single color for the displayed pixel. In such an embodiment, an attribute associated with a pixel may be adjusted by applying a filter difference to it, such as a brightness filter. Before the filter difference is applied, it may be scaled by multiplying the scaling factor for the pixel by the filter difference to create a scaled filter difference. The scaled filter difference may then be used to adjust one or more pixel attributes. For example, the red value may be scaled by applying the scaled filter difference. Further, all three color channels may be scaled by applying the scaled filter difference to each of them. In one embodiment, a pixel may comprise other attributes. For example, in one embodiment, a pixel may comprise a cyan color channel, a magenta color channel, a yellow color channel, and a black color channel. In another embodiment, a pixel may comprise one or more of an alpha channel, a hue channel, a saturation channel, or a brightness channel. In one embodiment, pixel attributes may comprise grayscale values, or different bit depths, including without limitation 1, 8, 16, and 32 bit depths. Still further pixel attributes would be apparent to one of ordinary skill in the art. Each of these attributes may be scaled with the scaling filter difference.

Applying scaled filter differences to pixel attributes may cause the pixel to change color when displayed. However, the effect on the displayed pixel color may be varied based on the position of the pixel relative to the camera. For pixels that are distant from the camera, the filter difference may be significantly reduced based on the scaling factor calculated for the pixel, causing the distant areas to be de-emphasized. Further, for pixels that are near to the camera, the filter difference, based on the scaling factor, may be increased (or may not be reduced), thus emphasizing the near area relative to the distant area and providing an enhanced sense of depth. Because of the algorithm used to calculate the scaling factor in (1), pixels at or near the first selected pixel 131 will have a scaling factor of 1 or close to 1, meaning any filter differences, such as brightness or contrast, will be scaled very little, while filter differences of pixels at or near the second pixel 132 may have a scaling factor of 0, or close to 0, causing the filter difference to be significantly reduced. In one embodiment of the present invention, by providing significant relative scaling of distant pixels, the near pixels can be enhanced. In some embodiments of the present invention, filter differences for near pixels may be increased, while filter differences for distant pixels may be reduced, thus providing three-dimensional enhancement of an image.

In block 406, a modified image is generated using the modified attributes of each pixel in the set of pixels. For example, the image may be modified by applying the scaling factors as described above, and adding the scaled filter differences to the pixel attributes for each pixel in the set of pixels.

Figure 4:
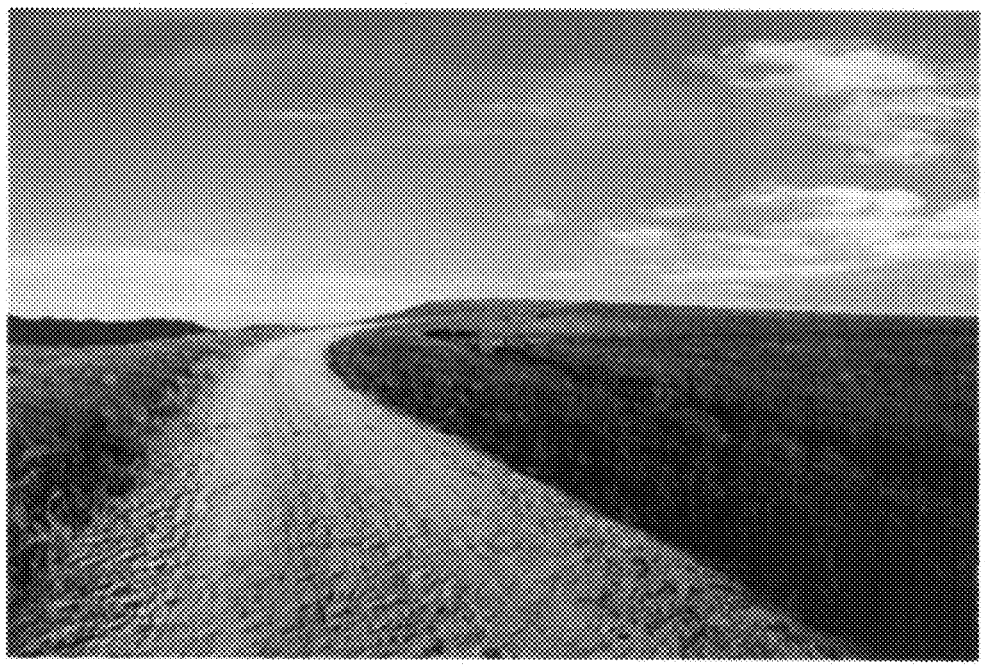
FIGS. 4 and 4A show the images of FIGS. 2 and 2A after three-dimensional enhancement using one embodiment of the present invention.
Figure 4A:
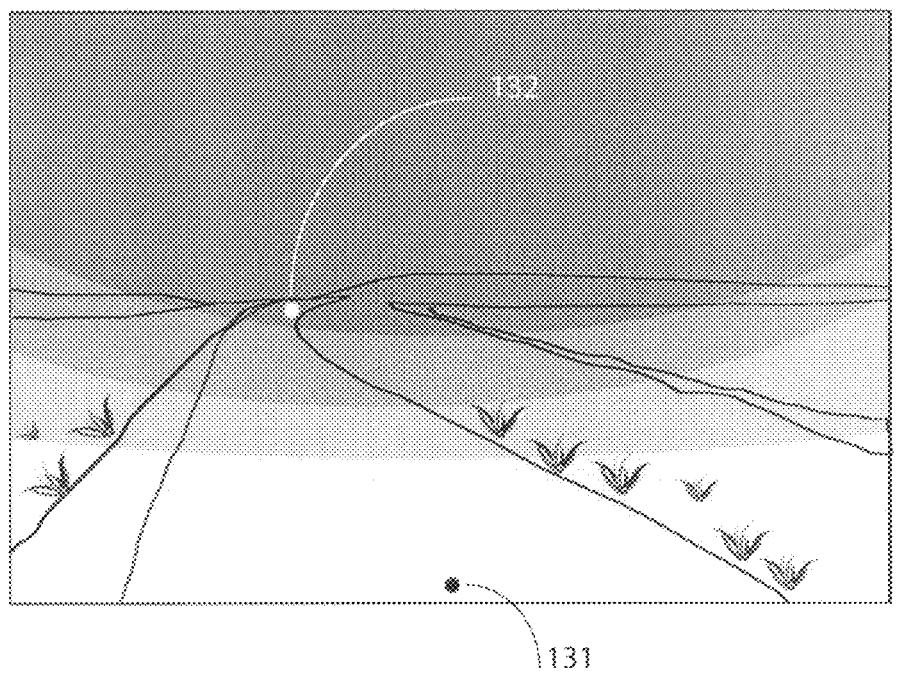

In block 407, the modified image is output. For example, in one embodiment, the modified image is displayed on display 102. For example, FIGS. 4 and 4A show the image of FIGS. 2 and 2A after it has been modified using this illustrative embodiment of the present invention. As may be seen in FIG. 4, the areas at or near the first selected pixel 131 have been brightened to provide a sense that the area is near to the camera. Further, the areas at or near the second selected point 132 are less bright and less emphasized, providing a sense that the area is distant from the camera. The varying levels of brightness between the first selected point 131 and the second selected point 132 may be seen in FIG. 4A as varying levels of grey-scale shading within the figure, with areas near to the camera appearing lighter than areas distant from the camera. For example, in FIG. 4A, pixels near the first selected pixel 131 have a relatively high scaling factor, which is shown by the light shading near the pixel. However, for pixels close to the second selected point 132, the darker shading indicates that the scaling factor for those pixels is relatively low. Further, pixels between the first and second selected pixel have intermediate scaling factors which is shown by the shaded regions between the first and second selected pixels 131, 132.

In another embodiment, the modified image may be stored to a file on a non-volatile storage medium, such as a hard drive. The modified image may be stored in a single file, or in multiple files. For example, in one embodiment of the present invention, the modified image may be stored in a first file and a second file. In such an embodiment, the first file may comprise the unmodified image, and the second file may comprise the scaling factors associated with the pixels in the unmodified image.

In a further embodiment, the modified image may comprise a shaded layer overlaid on the image to show the scaling factors for each pixel. In such an embodiment, a partially-transparent grey-scale overlay may be displayed over the image to assist a user to better select first and second selections. In a related embodiment, a grey-scale image showing the values of the scaling factors may be shown instead of the image. In such an embodiment, pixels having a low scaling factor may be displayed as dark grays or blacks, while pixels having higher scaling factors may be displayed as lighter grays or whites. By viewing the distribution of scaling factors, a user may be able to re-position the selections made, such as the position of first and/or second pixels or regions.

Figure 6:
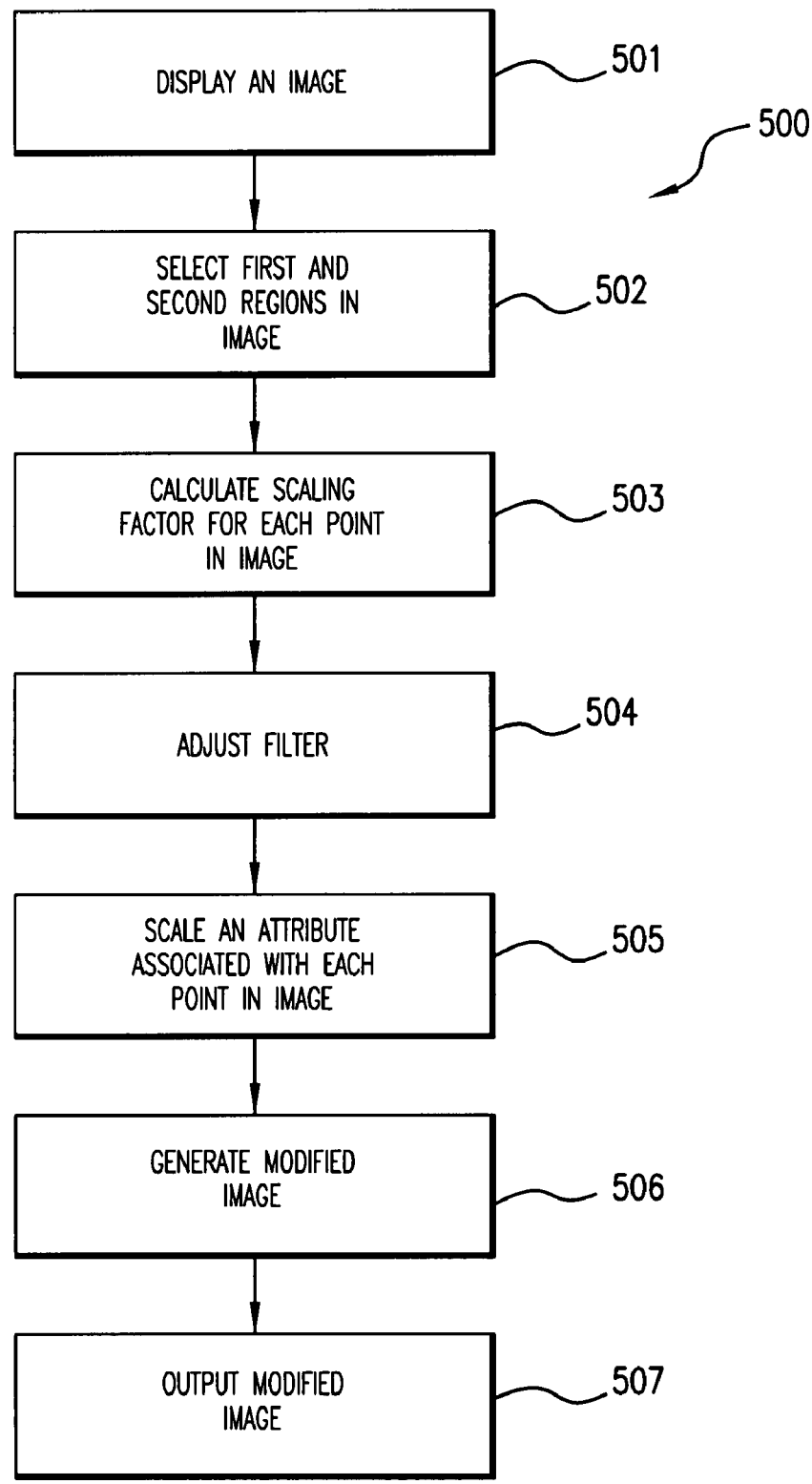
FIG. 6 shows a method for three-dimensional enhancement of two-dimensional images according to one embodiment of the present invention.

Referring now to FIG. 6, FIG. 6 shows a method 500 for three-dimensional enhancement of two-dimensional images according to one embodiment of the present invention. The method 500 shown in FIG. 5 will be discussed with reference to the system 100 shown in FIG. 1.

In block 501, and similar to block 401, the system 100 displays the image 130. For example, the image 600, 700, 800, 900 shown in one of FIG. 7A, 8A, 9A, or 10A, respectively, may be displayed on display 102.

Figure 7B:
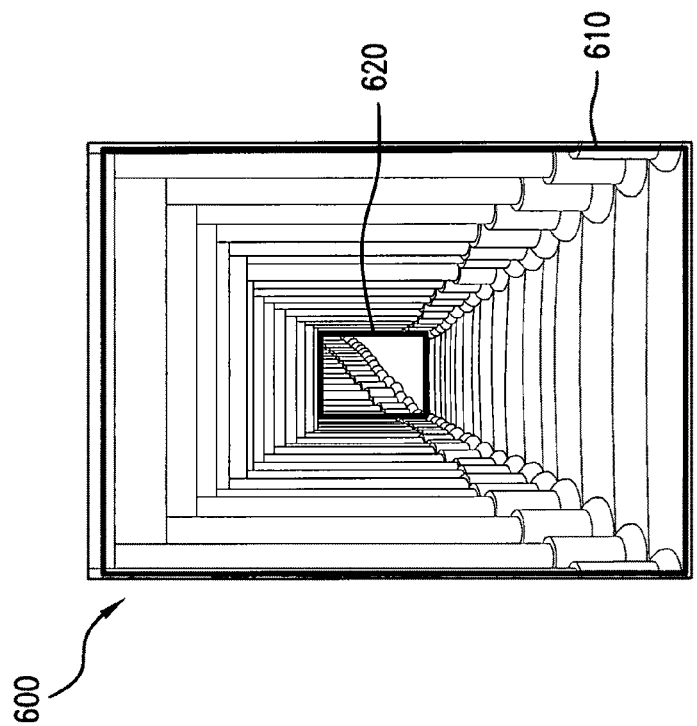
FIG. 7B shows the image of FIG. 7A having first and second regions using one embodiment of the present invention.
Figure 8A:
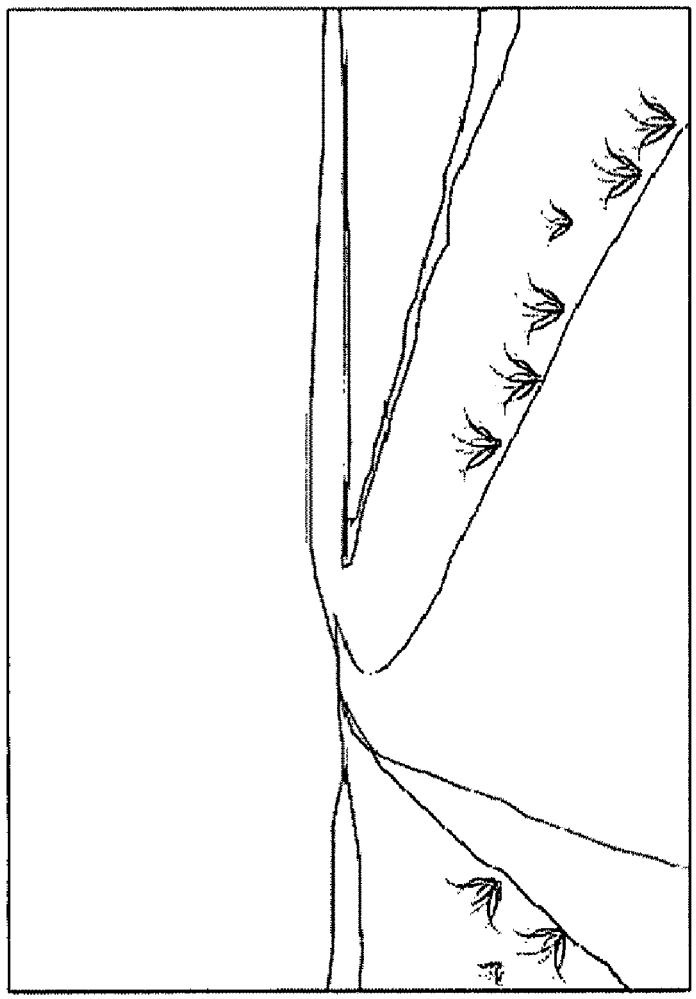
FIG. 8A show an image to be enhanced using one embodiment of the present invention.
Figure 8B:
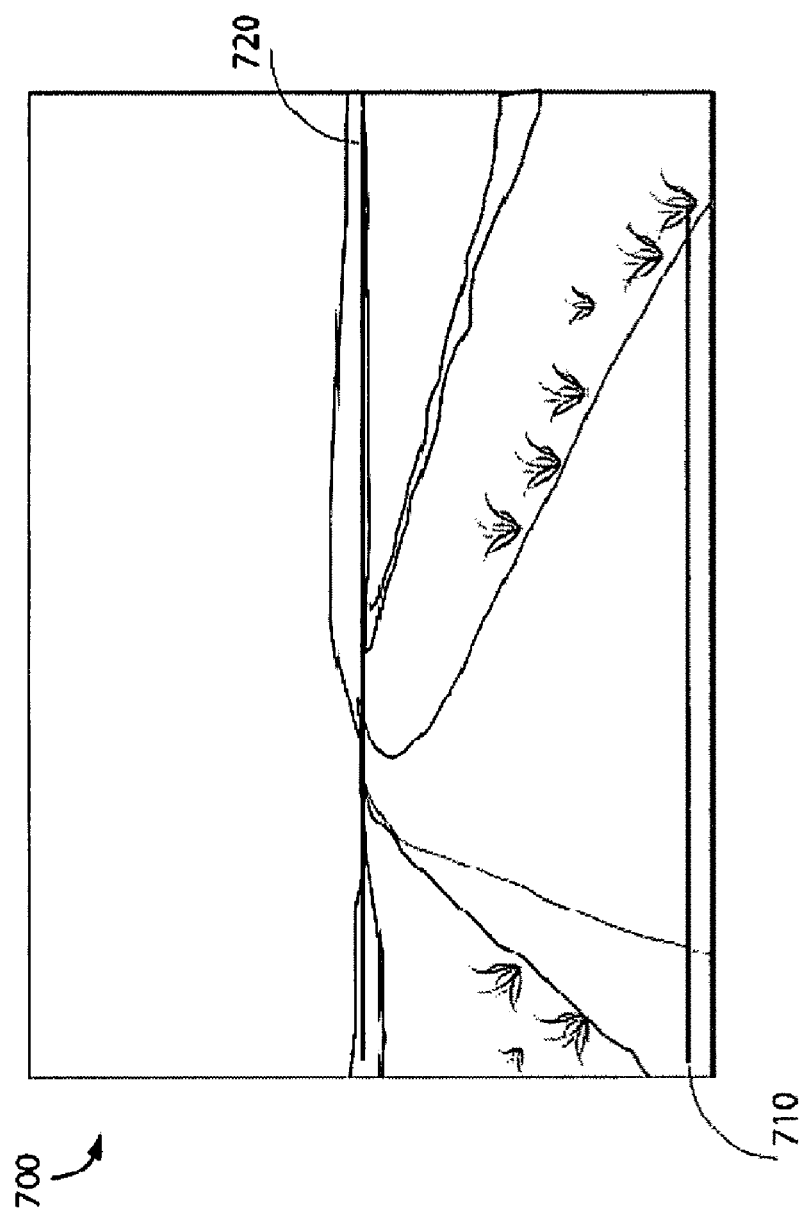
FIG. 8B shows the image of FIG. 8A having first and second regions using one embodiment of the present invention
Figure 9A:
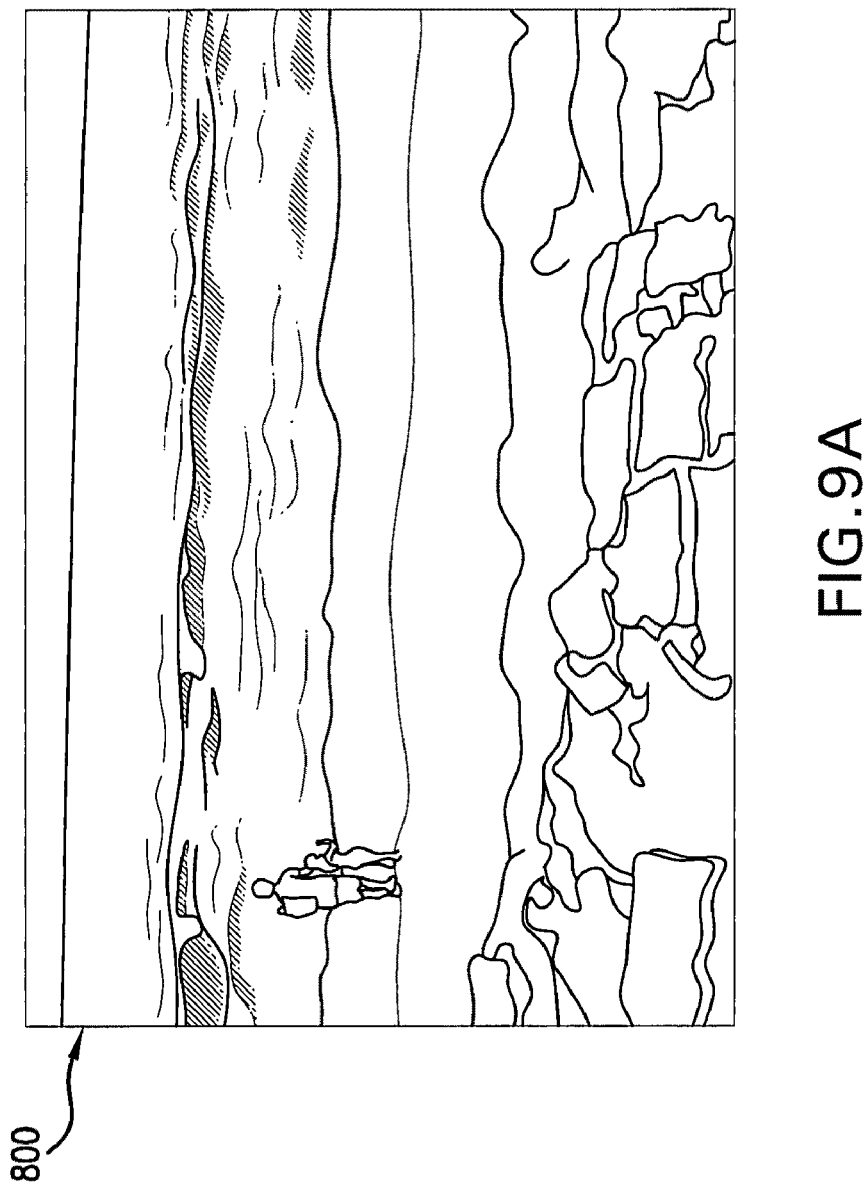
FIG. 9A shows an image to be enhanced using one embodiment of the present invention.
Figure 9B:
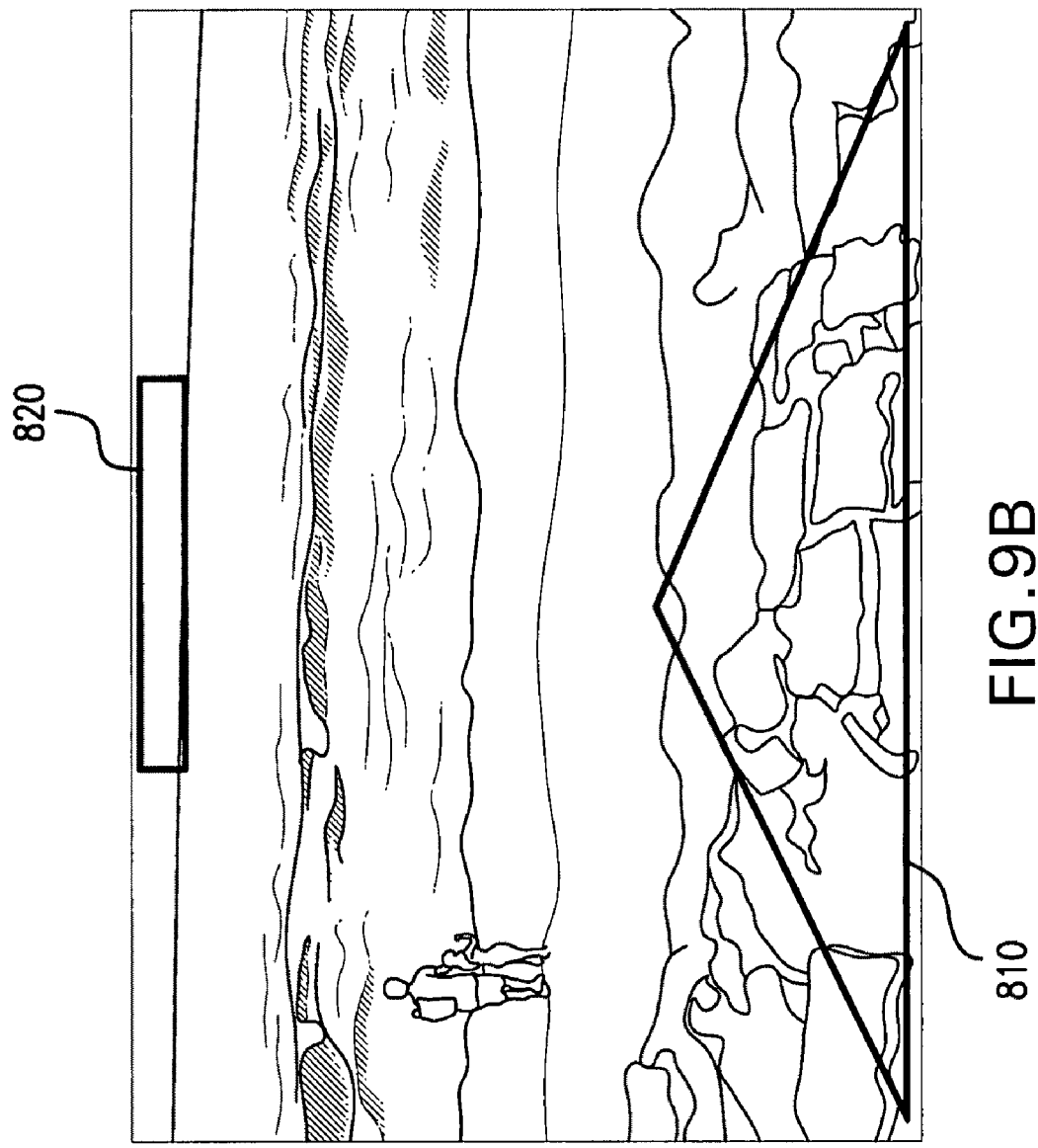
FIG. 9B shows the image of FIG. 9A having first and second regions using one embodiment of the present invention.

In block 502, the user selects a first region associated with the image. A region within an image is an area within the image comprising a plurality of pixels. The first region corresponds to a region near to the camera. In various embodiments of the present invention, a region may be a line, a closed shape, or an open shape. For example, in one embodiment of the present invention, a user may select a first region 610 in the image 600 having a rectangular shape, such as may be seen in FIG. 7B. While the first region 610 in the image 600 in FIG. 7B has a rectangular shape, the first region may have other shapes as well. For example, the first region 710 in the image 700 in FIG. 8B comprises a line, and the first region 810 in the image 800 in FIG. 9B comprises a triangular region.

Figure 10A:
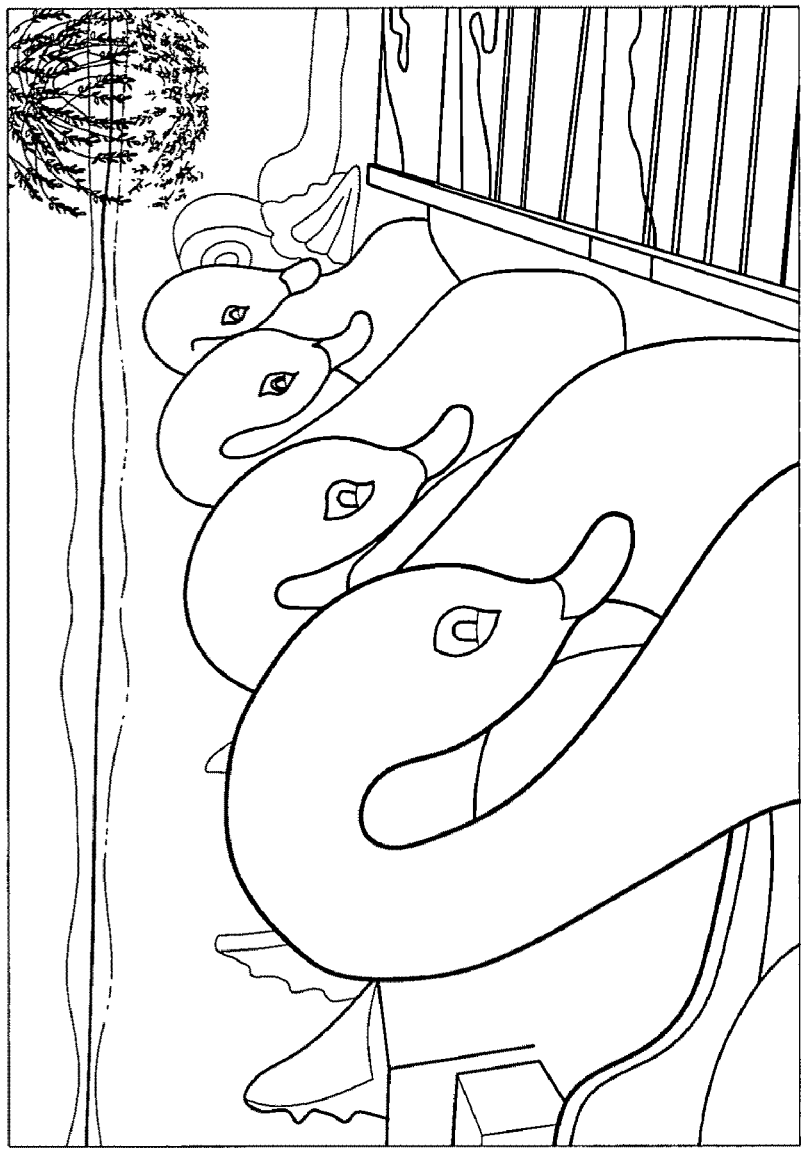
FIG. 10A shows an image to be enhanced using one embodiment of the present invention.
Figure 10B:
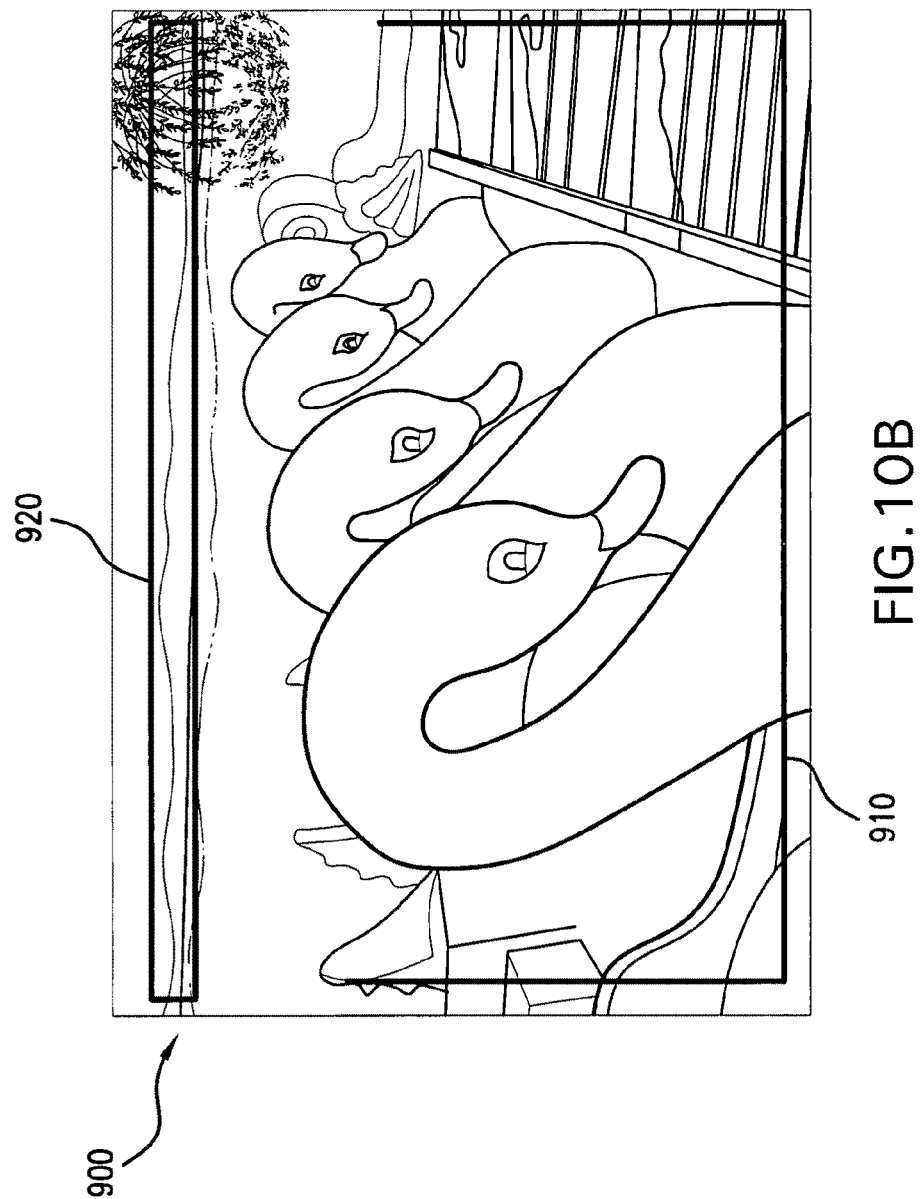
FIG. 10B shows the image of FIG. 10A having first and second regions using one embodiment of the present invention.

An application 120 according to one embodiment of the present invention may allow a user to draw a first region within an image. For example, in one embodiment, the application 120 may allow the user to draw a first region with a freehand drawing tool. In one embodiment, the application 120 may allow a user to select one or more tools to draw a shape, such as a polygon, a shape having curved edges, such as a circle or oval, or any other arbitrary shape that may be closed or open. For example, FIG. 10B shows a first region 910 having a three-sided open shape.

In block 502, the user also selects a second region in the image 130. In one embodiment of the present invention, the second region. Like the first region, the second region may be a line, an unbounded area, or a bounded area. For example, in one embodiment of the present invention, a user may select a second region 620 in the image 600 having a rectangular shape, such as may be seen in FIG. 7B. The second region may have other shapes as well. For example, in FIG. 8B, the second region 720 is defined by a line. Still further embodiments of the present invention may have second regions having different shapes and areas.

Figure 13:
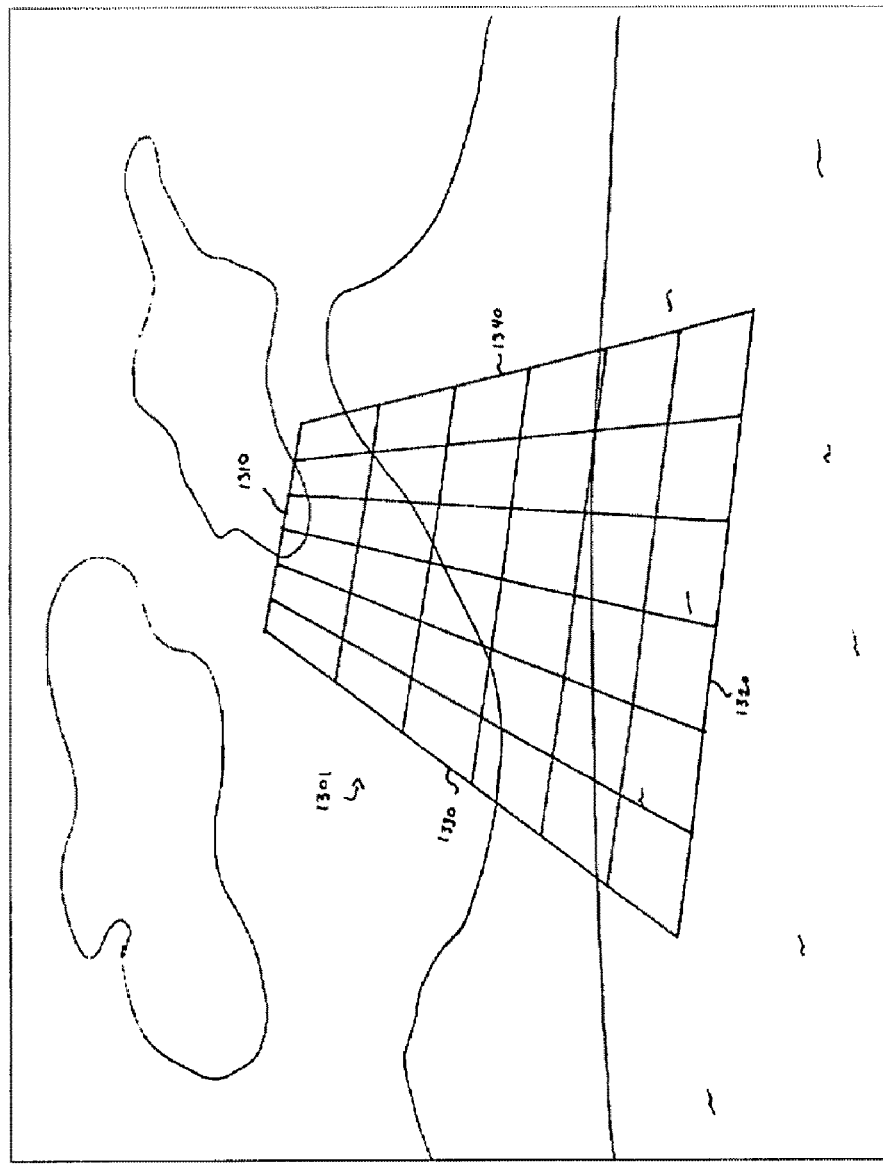
FIG. 13 shows an image to be enhanced using one embodiment of the present invention.

For example, in one embodiment of the present invention, a user may use a tool within the application to define attributes associated with the image. For example, in FIG. 13, an image 1300 includes an user-defined perspective 1301 that indicates the perspective of the image 1300 associated with a vanishing point. The substantially horizontal edges 1310, 1320 of the object 1301 indicate near and distant regions of the picture, while the edges 1330, 1340 connecting the horizontal edges 1310, 1320 indicate perspective lines to a vanishing point. Using such an embodiment, a user may define an perspective 1301 and select portions of the perspective 1301 to indicate the first and second regions. For example, in the embodiment shown in FIG. 13, a user may select the near edge 1320 of the perspective 1301 to be the first region, and the distant edge 1310 of the perspective 1301 to be the second region.

It should be noted that a region may only comprises the pixels along the boundary of the region, and not the pixels enclosed within the region. For example, the first region 610 in FIG. 7B includes all of the pixels that are overlapped by the boundaries specified in the first region 610, but not the pixels in the interior of the region 610. Likewise, the second region 620 comprises the pixels overlapped by the boundaries specified in the second region, but not the pixels in the interior of the region. Thus, these regions are not a boundary of a region, but are themselves the set of pixels that are near the camera. In another embodiment, a user may specify a region defining an enclosed area. For example, in one embodiment a region may be defined by two rectangles, and the region may comprise the area between the two rectangles.

Figure 11A:
FIG. 11A shows an image to be enhanced using one embodiment of the present invention.

While embodiments having first and second regions have been disclosed, in one embodiment of the present invention may include a plurality of regions defining regions near to the camera, or regions distant from the camera. For example, in FIG. 11B, a first region 1010 defines a region near to the camera, while regions 102a-c define regions distant from the camera. Such an embodiment may be advantageous when enhancing an image having multiple non-contiguous regions in the distance.

In block 503, a scaling factor for each pixel in a set of pixels in the image is calculated. In the embodiment shown in FIG. 6, the scaling factor for any arbitrary pixel is computer based on the following formula:

$$F=D2/(D1+D2) \qquad (1)$$

F represents the scaling factor, and may have a different value for each pixel in the image 130. For any arbitrary pixel in the image 130, D1 is the distance from the pixel to the closest pixel in the first region, and D2 is the distance from the pixel to the closest pixel in the second pixel.

Figure 7A:
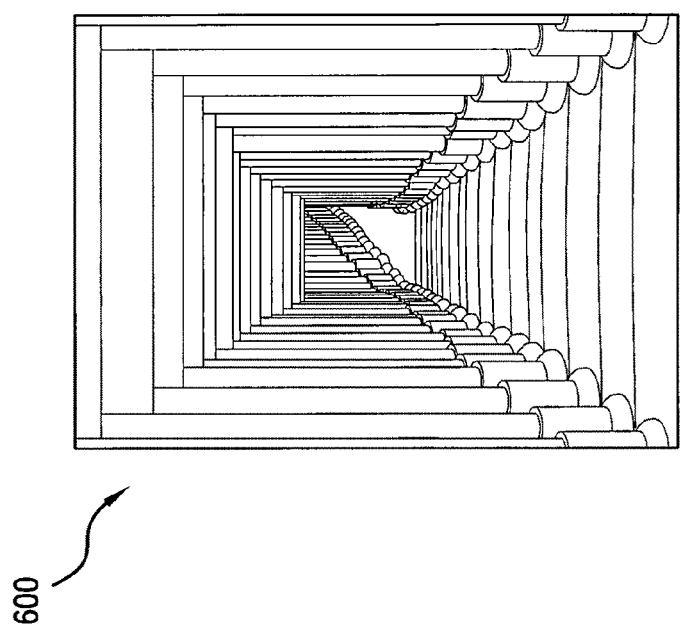
FIG. 7A shows an image to be enhanced using one embodiment of the present invention.
Figure 12:
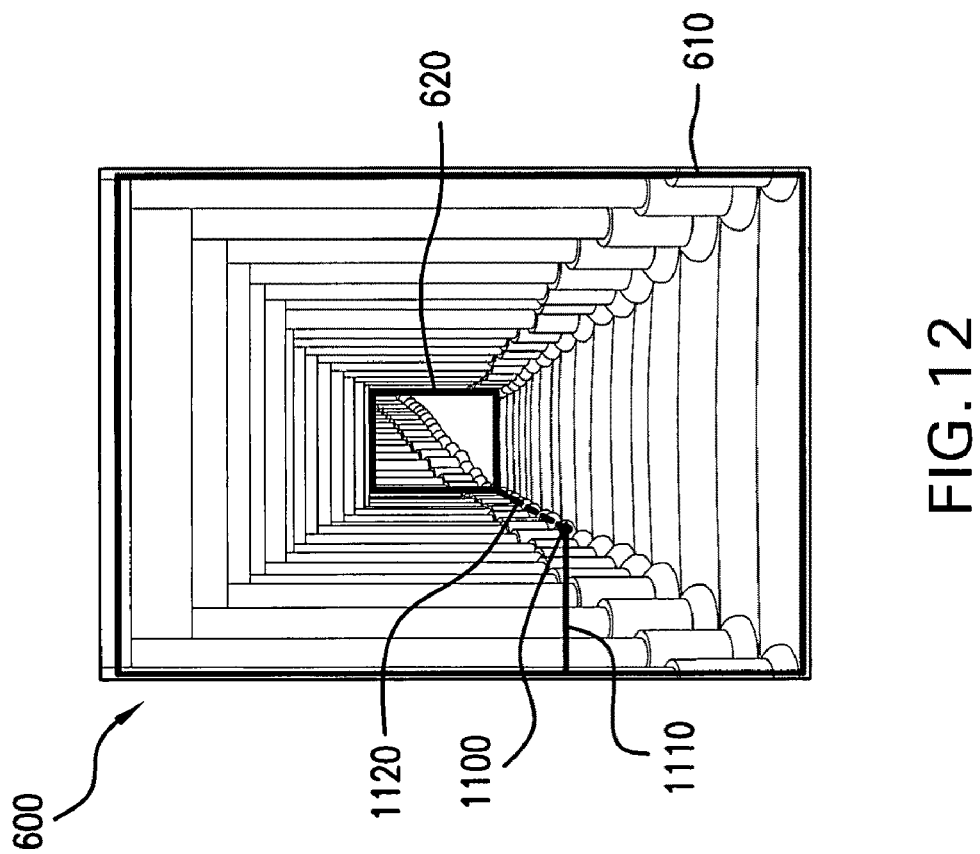
FIG. 12 shows the image of FIG. 7A having a pixel to be scaled and having first and second regions using one embodiment of the present invention.

For example, FIG. 12 shows the image 600 from FIG. 7A as well as a pixel and its distance from the first region 610 and the second region 620. A scaling factor for a pixel 1100 is calculated based on its distance 1110 from the first region 610 and its distance 1120 from the second region 620. In one embodiment, the distance 1110 to the first region is calculated based on the location of the pixel in the region that is closest to the pixel 1100, which is the perpendicular distance from the pixel 1100 to the first region, if such a measurement is possible. If a perpendicular distance to a pixel within the region is not available, a side of the region nearest the pixel 1100 may be extended such that a perpendicular distance (referred to as P) from the pixel 1100 to a pixel on the extended side may be calculated. The distance that the side had to be extended is then calculated (referred to as E). The distance from the pixel 1100 to the first region 620 is then calculated using Pythagorean's Theorem which results in the distance, D1, being the square root of $P^2+E^2$ from the pixel 1100 to the first region 620. The distance, D2, to the second region 620 is calculated using the same algorithm. Once the two distances, D1 and D2 have been calculated, the scaling factor for the pixel may be calculated. Additionally, the scaling factor may be scaled to have a different range and end pixels as described previously.

In one embodiment, the distances, D1 and D2, may be calculated by determining the distance from a pixel to each of the edges defining the first and second regions, such as a line or part of a curved edge of a region, and selecting the shortest distance to the first region and the shortest distance to the second region. Further, in one embodiment, a region may be defined as an area between two shapes, such as a region between two polygons. In such an embodiment, distance D1 may be calculated by selecting the minimum of the distances from an arbitrary pixel to each of the boundaries of the area between the two shapes defining the first region, and distance D2 may be calculated by selecting the minimum of the distances from the pixel to each of the boundaries of the area between the two shapes defining the second region. In such an embodiment, pixels within the first region have a distance D1=0, and pixels within the second region have a distance D2=0.

In block 504, the user applies a filter to the set of pixels. As discussed previously, a user may adjust or apply a brightness filter to the image. A brightness filter may cause pixels in the image to increase or decrease in intensity, based on whether the user desires the image to be brighter or darker. A filter may cause pixel attributes to be increased or decreased by some amount, which is referred to herein as the filter difference. Thus, when a user applies a filter, each pixel is increased or decreased by a filter difference associated with the filter. In some embodiments, the filter difference may be the same for each pixel in the image, while in other embodiments, each pixel may have a different filter difference.

In block 505, the scaling factors calculated for each pixel in the set of pixels are used to scale a filter difference associated with each pixel in the set of pixels. For example, in one embodiment of the present invention, each filter difference to be scaled is multiplied by the corresponding scaling factor. In one embodiment of the present invention comprising multiple scaling factors per pixel, each of the scaling factors may be multiplied with the corresponding filter difference for the corresponding pixel attributes.

In block 506, a modified image is generated using the modified attributes of each pixel in the set of pixels. For example, the image may be modified by applying the scaling factors as described above, and replacing the existing pixel attribute values with the modified pixel attribute values.

In block 507, the modified image is output. For example, in one embodiment, the modified image is displayed on display 102. In another embodiment, the modified image may be stored to a file on a non-volatile storage medium, such as a hard drive. The modified image may be stored in a single file, or in multiple files. For example, in one embodiment of the present invention, the modified image may be stored in a first file and a second file. In such an embodiment, the first file may comprise the unmodified image, and the second file may comprise the scaling factors associated with the pixels in the unmodified image.

Referring again to FIG. 1, embodiments of the present invention can be implemented in digital electronic circuitry, or in computer hardware, firmware, software, or in combinations of them. In one embodiment, a computer 101 may comprise a processor 110 or processors. The processor 110 comprises a computer-readable medium, such as a random access memory (RAM) coupled to the processor. The processor 110 executes computer-executable program instructions stored in memory 111, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may be used, such as a router, private or public network, or other transmission device. The processor, and the processing, described may be in one or more structures, and may be dispersed through one or more structures. The processor may comprise code for carrying out one or more of the methods (or parts of methods) described herein.

General

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method, comprising:
    selecting a first selection and a second selection within an image, the image from a perspective of a camera and comprising a plurality of pixels and depicting a scene;
    calculating a scaling factor for each pixel in a set of pixels in the image based at least in part on the first and second selections, the scaling factor indicating a distance of a pixel in the scene from the camera;
    applying a filter to the set of pixels, the filter comprising at least one filter difference for each pixel in the set of pixels;
    generating a modified image at least by modifying a pixel attribute for each pixel in the set of pixels based at least in part on the scaling factor and the filter difference; and
    outputting the modified image.

2. The method of claim 1, wherein the first selection comprises a first pixel and the second selection comprises a second pixel.

3. The method of claim 2, wherein calculating a scaling factor for each pixel in the image comprises:
    calculating a first distance from each pixel to the first pixel, calculating a second distance from each pixel to the second pixel;

calculating the scaling factor by dividing the second distance by the sum of the first distance and the second distance.

4. The method of claim 3, further comprising multiplying the scaling factor by a sized of a scale range, and adding a minimum scaled range value.

5. The method of claim 1, wherein the first selection comprises a first region and the second selection comprises a second region.

6. The method of claim 5, wherein the first region comprises an area.

7. The method of claim 5, wherein calculating a scaling factor for each pixel in the image comprises:

calculating a first distance from each pixel to the first region, calculating a second distance from each pixel to the second region; and calculating the scaling factor by dividing the second distance by the sum of the first distance and the second distance.

8. The method of claim 7, further comprising multiplying the scaling factor by a size of a scaled range, and adding a minimum scaled range value.

9. The method of claim 1, wherein the first selection comprises a plurality of first selections.

10. The method of claim 1, wherein the second selection comprises a plurality of second selections.

11. The method of claim 1, further comprising storing the scaling factor for each pixel in the image.

12. The method of claim 1, wherein the filter comprises at least one of a brightness filter, a contrast filter, a sharpness filter, a negative filter, a noise filter, a distortion filter, or a blur filter.

13. The method of claim 1, wherein calculating a scaling factor further comprises calculating a plurality of scaling factors for each pixel in the image based at least in part on at least in part on the first and second selections.

14. The method of claim 13, wherein each of the plurality of scaling factors is associated with a different pixel attribute or filter.

15. The method of claim 1, wherein the set of pixels comprises all of the pixels within the image.

16. The method of claim 1, wherein the set of pixels comprises less than all of the pixels within the image.

17. A computer-readable medium on which is encoded program code, the program code comprising:

program code for selecting a first selection and a second selection within an image, the image from a perspective of a camera and comprising a plurality of pixels and depicting a scene;

program code for calculating a scaling factor for each pixel in a set of pixels in the image based at least in part on the first and second selections, the scaling factor indicating a distance of a pixel in the scene from the camera;

program code applying a filter to the set of pixels, the filter comprising at least one filter difference for each pixel in the set of pixels;

program code generating a modified image at least by modifying a pixel attribute for each pixel in the set of pixels based at least in part on the scaling factor and the filter difference; and program code for generating a modified image at least by scaling an image attribute at each pixel in the set of pixels based at least in part on the scaling factor; and program code for outputting the modified image.

18. The computer-readable medium of claim 17, wherein the first selection comprises a first pixel and the second selection comprises a second pixel.

19. The computer-readable medium of claim 18, wherein calculating a scaling factor for each pixel in the image comprises:

program code for calculating a first distance from each pixel to the first pixel, program code for calculating a second distance from each pixel to the second pixel;

program code for calculating the scaling factor by dividing the first distance by the sum of the first distance and the second distance.

20. The computer-readable medium of claim 17, wherein the first selection comprises a first region and the second selection comprises a second region.

21. The computer-readable medium of claim 20, wherein calculating a scaling factor for each pixel in the image comprises:

program code for calculating a first distance from each pixel to the first region, program code for calculating a second distance from each pixel to the second region; and program code for calculating the scaling factor by dividing the first distance by the sum of the first distance and the second distance.

22. A system, comprising:

a display;

an input device; and a computer in communication with the display and the input device, the computer comprising a processor, the processor configured to:

cause an image to be displayed by the display;

receive a selection of a first selection and a second selection within an image, the image from a perspective of a camera and comprising a plurality of pixels and depicting a scene;

calculate a scaling factor for each pixel in a set of pixels in the image based at least in part on the first and second selections, the scaling factor indicating a distance of a pixel in the scene from the camera;

apply a filter to the set of pixels, the filter comprising at least one filter difference for each pixel in the set of pixels;

generate a modified image at least by modifying a pixel attribute at each pixel in the set of pixels based at least in part on the scaling factor and the filter difference; and output the modified image.

23. The system of claim 22, wherein the first selection comprises a first pixel and the second selection comprises a second pixel.

24. The system of claim 23, wherein the processor is configured to calculate a scaling factor for each pixel in the image by:

calculating a first distance from each pixel to the first pixel, calculating a second distance from each pixel to the second pixel, and calculating the scaling factor by dividing the second distance by the sum of the first distance and the second distance.

25. The system of claim 22, wherein the first selection comprises a first region and the second selection comprises a second region.

26. The system of claim 25, wherein the processor is configured to calculate a scaling factor for each pixel in the image by:
 calculating a first distance from each pixel to the first region,
 calculating a second distance from each pixel to the second region; and
 calculating the scaling factor by dividing the second distance by the sum of the first distance and the second distance.

* * * * *

UNITED STATES PATENT AND TRADEMARK OFFICE
CERTIFICATE OF CORRECTION

| | | |
|---|---|---|
| PATENT NO. | : 8,086,060 B1 | |
| APPLICATION NO. | : 11/973952 | |
| DATED | : December 27, 2011 | |
| INVENTOR(S) | : Anant Gilra and Arun Koormamtharayil | |

It is certified that error appears in the above-identified patent and that said Letters Patent is hereby corrected as shown below:

IN THE CLAIMS:

Column 13, Line 7 (Claim 4, Line 2)
Delete the phrase "sized of a scale range" and insert --size of a scaled range-- in place thereof.

Signed and Sealed this
Sixth Day of March, 2012

David J. Kappos
*Director of the United States Patent and Trademark Office*